US012033817B2

(12) United States Patent
Rognard et al.

(10) Patent No.: US 12,033,817 B2
(45) Date of Patent: Jul. 9, 2024

(54) CIRCUIT BREAKER WITH SIMPLIFIED NON-LINEAR DOUBLE MOTION

(71) Applicant: General Electric Technology GmbH, Baden (CH)

(72) Inventors: Quentin Rognard, Villeurbanne (FR); Jerome Laurent, Villeurbanne (FR); David Berard, Villeurbanne (FR)

(73) Assignee: General Electric Technology GmnH, Baden (CH)

(*) Notice: Subject to any disclaimer, the term of this patent is extended or adjusted under 35 U.S.C. 154(b) by 215 days.

(21) Appl. No.: 17/780,912

(22) PCT Filed: Nov. 26, 2020

(86) PCT No.: PCT/EP2020/083447
§ 371 (c)(1),
(2) Date: May 27, 2022

(87) PCT Pub. No.: WO2021/105259
PCT Pub. Date: Jun. 3, 2021

(65) Prior Publication Data

US 2023/0005675 A1 Jan. 5, 2023

(30) Foreign Application Priority Data

Nov. 29, 2019 (EP) .................................... 19212719

(51) Int. Cl.
*H01H 3/42* (2006.01)
*H01H 33/02* (2006.01)
*H01H 33/50* (2006.01)

(52) U.S. Cl.
CPC ............. *H01H 3/42* (2013.01); *H01H 33/50* (2013.01); *H01H 2033/028* (2013.01)

(58) Field of Classification Search
CPC .. H01H 3/42; H01H 3/46; H01H 1/36; H01H 33/50; H01H 33/021; H01H 33/7069; H01H 33/565; H01H 2033/028
(Continued)

(56) References Cited

U.S. PATENT DOCUMENTS 6,365,863 B1 * 4/2002 Marin .................... H01H 33/42 218/78
6,462,295 B1 * 10/2002 Knobloch .......... H01H 33/7069 218/54

(Continued)

FOREIGN PATENT DOCUMENTS

DE 10213200918 A1 7/2014
FR 3001329 A1 7/2014

(Continued)

OTHER PUBLICATIONS

European Search Report issued in EP19212719.9, dated Mar. 2, 2020, 7 pages.

(Continued)

*Primary Examiner* — William A Bolton
(74) *Attorney, Agent, or Firm* — Eversheds Sutherland (US) LLP

(57) ABSTRACT

The invention concerns a double-motion circuit breaker comprising primary and secondary movable contacts slidingly mounted within primary and secondary holders, wherein the primary movable contact comprises a tulip and a contact cylinder attached thereto, and the secondary movable contact comprises a pin for engaging the tulip but no counter-contact for engaging the contact cylinder. The circuit breaker also has a non-linear linkage mechanism with a pin and slot mechanism, and a fixed dielectric shield provided on the secondary holder. During disconnection, the linkage mechanism is preferably arranged to move the pin more than the tulip, proportionally to their maximum stroke,
(Continued)

so as to quickly bring the pin tip within the fixed dielectric shield, whereafter the tulip moves more than the pin. This circuit breaker is cheaper, lighter and can be disconnected more quickly.

15 Claims, 4 Drawing Sheets

(58) Field of Classification Search
USPC .... 218/154, 153, 51, 53, 57, 59, 61, 63, 68, 218/72
See application file for complete search history.

(56) References Cited

U.S. PATENT DOCUMENTS 8,013,268 B2 * 9/2011 Ozil ..................... H01H 33/91 218/155
8,304,677 B2 * 11/2012 Yoon ..................... H01H 33/904 218/78
8,389,886 B2 * 3/2013 Dahlquist .............. H01H 33/74 218/59
9,460,873 B2 * 10/2016 Cernat ................. H01H 33/025
9,484,161 B2 * 11/2016 Gericke ................. H01H 21/36
9,543,081 B2 * 1/2017 Ozil ......................... H01H 3/46
10,043,622 B1 * 8/2018 Park ......................... H01H 3/46
2006/0151438 A1 * 7/2006 Urai ..................... H01H 33/904 218/57
2014/0175061 A1 * 6/2014 Heiermeier .............. H01H 3/46 218/154
2018/0182578 A1 6/2018 Terada et al.

FOREIGN PATENT DOCUMENTS

KR 101794903 B1 11/2017
WO 2021105259 A1 6/2021

OTHER PUBLICATIONS

International Search Report issued in PCT/EP2020/083447, dated Jan. 11, 2021, 10 pages.

* cited by examiner

CIRCUIT BREAKER WITH SIMPLIFIED NON-LINEAR DOUBLE MOTION

CROSS-REFERENCE TO RELATED APPLICATIONS

This application is a U.S. National Stage Application under 35 U.S.C. 371 and claims the priority benefit of International Application No. PCT/EP2020/083447, filed Nov. 26, 2020, which claims priority to European Application No. EP19212719.9, filed Nov. 29, 2019, both of which are incorporated herein by reference.

TECHNICAL FIELD

The invention relates to the field of high-voltage circuit breakers for switchgears. More particularly, the invention relates to a simplified double-motion circuit breaker having a non-linear motion linkage mechanism. The invention also relates to a method of disconnecting a circuit breaker.

PRIOR ART

Non-linear double-motion high-voltage (HV) circuit breakers are well-known. U.S. Pat. No. 9,543,081 B2 discloses such a circuit breaker. It comprises two movable contacts that move in opposite directions to break the circuit. The primary movable contact comprises a tulip, a nozzle and contact cylinder attached together, while the secondary movable contact comprises a pin and a counter-contact cylinder attached together. A non-linear motion linkage mechanism transforms the movement of the primary movable contact in one direction into non-linear movement of the secondary movable contact in the opposite direction. In this way, the circuit breaker is able to break a circuit.

However, moving the various components of the circuit breaker consumes a lot of energy, as they are heavy, yet need sufficient acceleration and speed for the disconnection. On top of that, this circuit breaker has numerous moving parts, which makes it more susceptible in general to mechanical failure. Finally, it is also expensive, as certain components such as the contact cylinder and counter-contact cylinder, have to be coated in silver, so as to possess the required hardness and conductivity in order to assure proper functioning.

As such, there is clearly a need for a circuit breaker which is able to operate quicker, more reliable and is also cheaper.

BRIEF DESCRIPTION OF THE INVENTION

The present invention relates to a non-linear double-motion circuit breaker comprising a primary movable contact and a secondary movable contact slidingly mounted within a primary holder and a secondary holder respectively, wherein the primary movable contact comprises a tulip and a contact cylinder attached thereto, and the secondary movable contact comprises a pin having a pin tip, the circuit breaker further comprising a linkage mechanism arranged to allow non-linear movement of the secondary movable contact in an opposite direction to the movement of the primary movable contact, wherein the secondary holder has a fixed dielectric shield at an end opposing the primary holder, and wherein the secondary movable contact does not comprise a counter-contact for engaging the contact cylinder.

The present invention also relates to a method of disconnecting a non-linear double-motion circuit breaker comprising mounting a primary movable contact and a secondary movable contact slidingly within a primary holder and a secondary holder respectively, providing the primary movable contact with a tulip and an attached contact cylinder, and providing the secondary movable contact with a pin having a pin tip, providing a linkage mechanism allowing non-linear movement of the secondary movable contact in an opposite direction to the movement of the primary movable contact, and retracting the pin from the primary movable contact, without moving a counter-contact for engaging the contact cylinder, until the pin tip is within a fixed dielectric shield provided at an end of the secondary holder opposing the primary holder.

Preferable features of the invention are defined in the appendant claims.

BRIEF DESCRIPTION OF THE FIGURES

The invention will be better understood when reading the following detailed description and non-limiting examples, as well as studying the figures, wherein.

In all of these figures, identical references can designate identical or similar elements. In addition, the various portions shown in the figures are not necessarily shown according to a uniform scale, in order to make the figures more legible.

DETAILED DESCRIPTION OF PARTICULAR EMBODIMENTS

Figure 1:
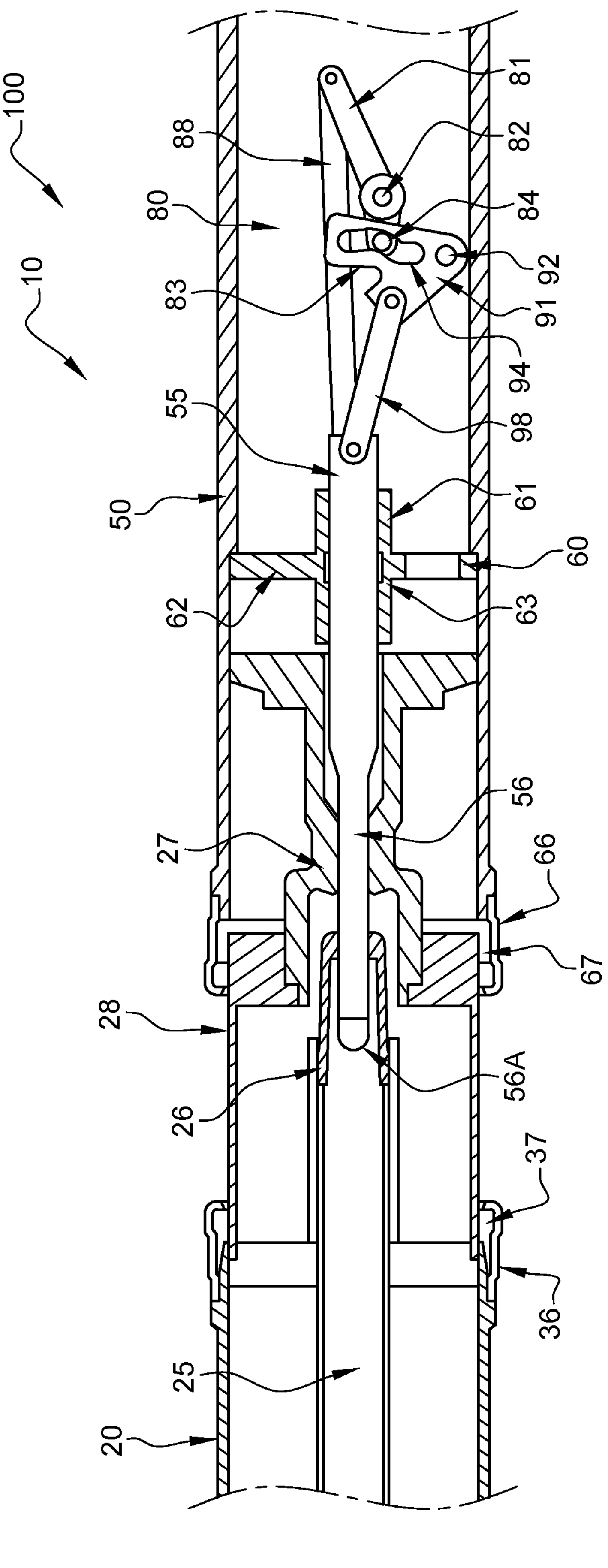
FIG. 1 shows a cross-section view of a circuit breaker according to a preferred embodiment of the invention, the circuit breaker being in the closed position.

FIG. 1 shows the circuit breaker 10 according to a preferred embodiment of the invention, showing in particular details of the two movable contacts 25, 55 of the circuit breaker, as well as its linkage mechanism 80, when it is in the closed position. The circuit breaker 10 comprises a primary (contact) holder 20 and a secondary (contact) holder 50, within which the primary movable contact 25 and the secondary movable contact respectively 55 are slidingly mounted. The linkage mechanism 80 transforms the movement of the primary movable contact 25 in one direction along a principal axis into non-linear movement of the secondary movable contact 55 in the opposite direction along the principal axis. In this preferred embodiment, the circuit breaker 10 is of the self-blast type and is also part of a switchgear 100.

Figure 2:
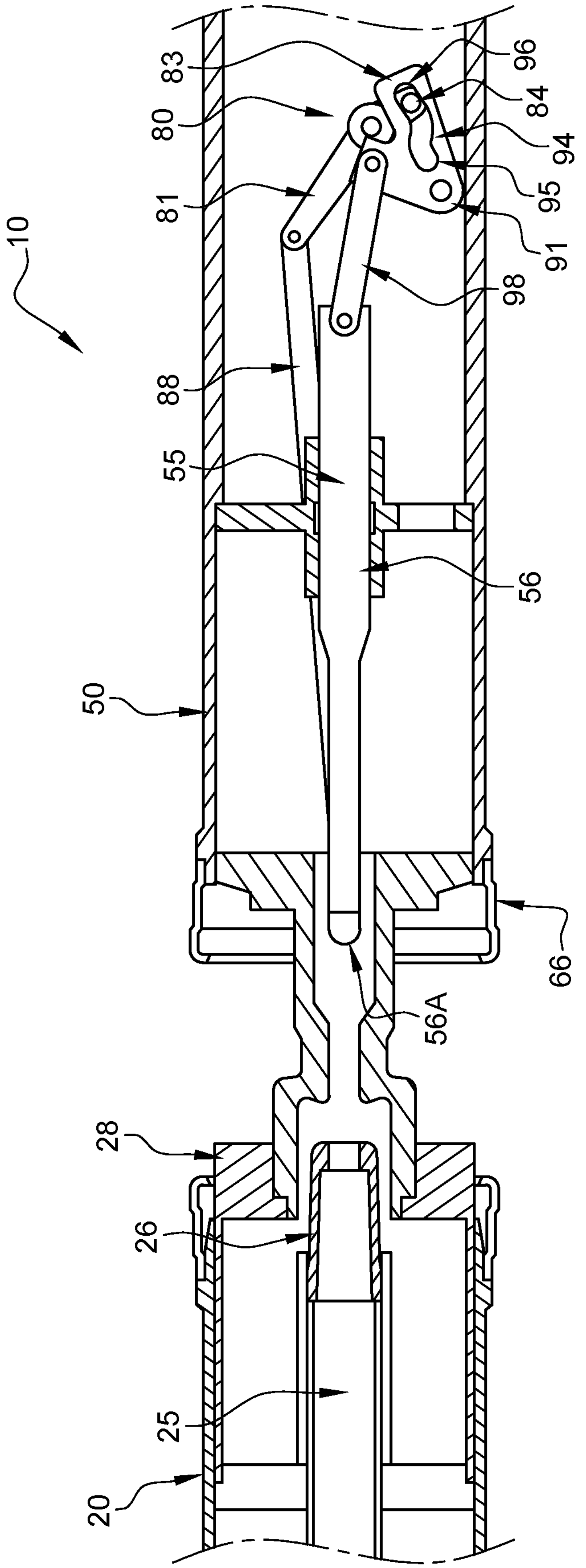
FIG. 2 shows a cross-section view of the same circuit breaker in the open position.

The primary movable contact 25 comprises a tulip 26, a nozzle 27 and a contact cylinder 28 attached together and arranged to move as a single unit. It is shown extending out of the primary holder 20 as the circuit breaker 10 is in the closed position. It is however able to move back into the primary holder 20, as can be seen in FIG. 2, which shows the open position of the circuit breaker 10.

Meanwhile, the secondary movable contact 55 comprises a pin 56. It is shown extending out of the secondary holder 50 as the circuit breaker 10 is in the closed position, engaged with the primary movable contact 25. More precisely, the pin 56 extends through the nozzle 27 of the primary movable contact 25, and is engaged with the tulip 26 thereof. It is able to move back into the secondary holder 20, as can be seen in FIG. 2 which shows the open position of the circuit breaker 10.

However, unlike the prior art, we observe that the secondary movable contact 55 does not comprise a counter-contact cylinder attached to the pin 56. This is an important aspect of the invention. As there is no counter-contact (cylinder or otherwise) attached to the pin, the linkage mechanism 80 does not have to move the combined mass of the pin 56 and counter-contact. Rather, it only has to move the much lighter pin 56. This crucially reduces the weight of the secondary movable contact 55, and as a consequence, the energy required to operate the circuit breaker 10 is also reduced. The absence of a counter-contact that needs to be moved on the circuit breaker 10 implies that disconnection can be achieved quickly.

The secondary holder 50 comprises a bridge 60 for slidingly supporting the pin 56. The bridge 60 has a sleeve 61 in which the pin 56 is located, to slide along the principal axis. In this embodiment, the secondary movable contact 55 has a maximum stroke which is around a third of that of the primary movable contact 25. The bridge 60 is ideally furnished with spokes 62 which support the sleeve 61 such that it is held centrally within the secondary holder 50. The sleeve 61 of the bridge 60 has contact points 63 on its interior which allow current to flow between the secondary holder 50 and the pin 56. Instead of contact points, flexible connections may be provided extending from the secondary holder 50 to the pin 56 to allow current to flow.

The circuit breaker 10 also comprises dielectric shields 36, 66 on the primary holder 20 and the secondary holder 50. They are fixed at the opposing ends of the primary holder 20 and secondary holder 50, surrounding effectively the primary movable contact 25 and secondary movable contact 55 and thus the principal axis too. These dielectric shields 36, 66 are designed for improving the dielectric resistance and reduce the possibility of flash-over during operation of the circuit breaker 10. Whereas the counter-contact cylinder of the prior art also served as a dielectric shield for the pin, this function is now provided for pin 56 by the dielectric shield 66 on the secondary holder 50.

With there being no counter-contact on the secondary movable contact 55, the contact cylinder 28 of the circuit breaker 10 of the invention is arranged to directly engage the secondary holder 20. When in the closed position, the contact cylinder 28 of the primary movable contact 25 engages the fixed dielectric shield 66 of the secondary holder 50. The inner circumference of the fixed dielectric shields 36, 66 are provided with contact points 37, 67, to improve the electrical continuity with the contact cylinder 28. When the contact cylinder 28 is in the open position, it is located essentially within the fixed dielectric shield 36, which help prevent flash-over. Likewise, for the pin 56, when the circuit breaker 10 is in the open position, the pin tip 56A will be within the fixed dielectric shield 66 of the secondary holder 50, which helps prevent flash-over.

Another novel aspect of this invention is the kinematics of the primary movable contact 25 and the secondary movable contact 55, which brings us to an interesting feature of the invention, namely the linkage mechanism 80. The linkage mechanism 80 of the circuit breaker 10 comprises a driving lever 81 and a driven lever 91. Both levers 81, 91 are mounted on pivots 82, 92 attached to the secondary holder 50. The axes of these pivots 82, 92 are parallel, and perpendicular to the principal axis, i.e. the direction of movement of the pin 56 and tulip 26. The driving lever 81 is connected by a driving rod 88 to the tulip 26/primary movable contact 25. This driving rod 88 extends between the spokes 62 of the bridge holding the pin 56. Meanwhile, the driven lever 91 is connected by a driven rod 98 to the pin 56/secondary movable contact 55.

The driving and driven levers 81, 91 are connected together by a pin and slot connection 83. The driving lever 81 has two legs, one being attached to the driving rod 88, while the other comprises a follower pin 84. Meanwhile, the driven lever 91 also has two legs, one being attached to the driven rod 98, while the other comprises a slot 94. This pin and slot connection 83 allows the movement of the driving lever 81 to control the movement of the driven lever 91, and is essentially located between pivot 82 of the driving lever 81 and the pivot 92 of the driven lever 91, able to move from one side of a notional line joining the pivots 82, 92 of the levers 81, 91 to the opposite side. The rotation of the driving and driven levers 81, 91 are in general opposite to each other, although this does not apply for the full extent of their motion.

The slot 94 has a short section 95 located closer to the pivot 92 of the driven lever 91 and an adjoining long section 96 located further away. The short section 95 is straight, while the long section 96 is curved, having the same radius as the follower pin 84 from its pivot 82. The curvature of the long section 96 of the slot 94 is generally inverted to the curvilinear trajectory of the follower pin 84 when on one side of the notional line between the pivots 82, 92, whereas it corresponds to the curvilinear trajectory of the follower pin 84 when on the other side.

The linkage mechanism 80 is arranged such that during the initial stage of disconnection, rotation of the driving lever 81 acts substantially on the driven lever 91, rotating it rather quickly, retracting the pin tip 56A to within the fixed dielectric shield 66. The pin 56 is actually withdrawn more than the tulip 26 during this stage, proportionally to their maximum stroke, reaching, or very nearly reaching, the end of its stroke, while the tulip 26 is only about halfway into its stroke.

During the later stage of disconnection however, the driving lever 81 does not act, or acts very little, to rotate the driven lever 91. Consequently, the pin 56 moves little or not at all during this stage, and is always maintained within the fixed dielectric shield 66, resulting in the tulip 26 being withdrawn more than the pin 56, proportionally to its maximum stroke. We will note that the total mass of movable contacts is reduced to only that of primary movable contact 25, meaning that the energy for the disconnection of the circuit breaker goes entirely towards moving the primary movable contact 25.

Figure 3:
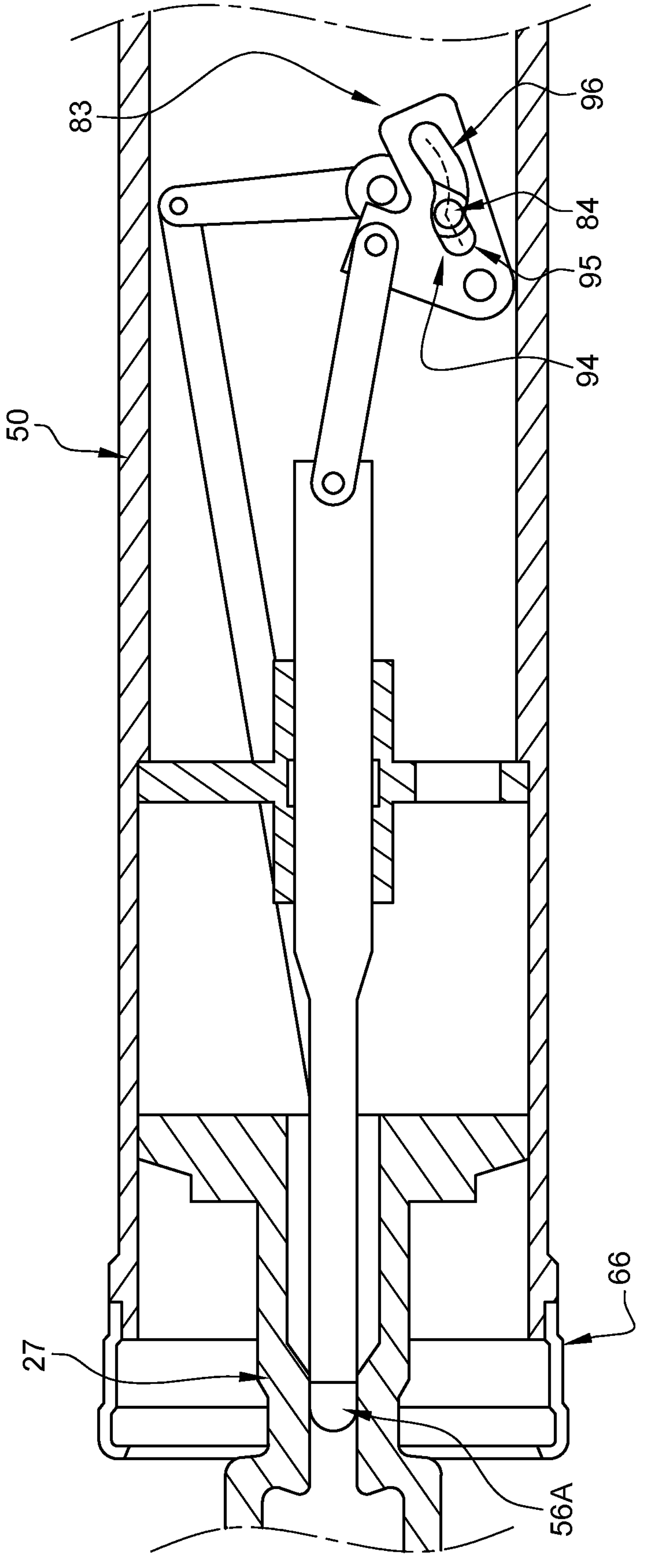
FIG. 3 shows a close-up cross-section view of the same circuit breaker, showing in particular its linkage mechanism at an intermediate position of the circuit breaker.

The disconnection of the circuit breaker 10 can thus be viewed as having a first stage between the closed and an intermediate position where the pin tip 56A is within the fixed dielectric shield 66 and has stopped retracting, and a second stage between the intermediate and open position. FIG. 3 shows the linkage mechanism 80 at the intermediate position of the circuit breaker 10.

This operation of the linkage mechanism 80 is achieved, in part, by the pin and slot connection 83 between the levers 81, 91, which is configured such that, between the closed and the intermediate position, rotation of the driving lever 81 causes the follower pin 84 to travel in the slot 94 such that it rotates substantially the driven lever 91, whereas between the intermediate and the open position, the follower pin 84 travels in the slot 94 such that it does not rotate, or rotates very little, the driven lever 91.

Furthermore, the pin and slot mechanism 83 is configured such that, on one side of the notional line, the follower pin 84 moves in one direction in the slot 94, and on the other side of the notional line, the follower pin 84 moves in the opposite direction in the slot 94.

For the avoidance of doubt, it is being stated here that the tulip 26 typically moves faster than the pin 56 throughout the operation of the circuit breaker 10. However, proportionally to their maximum strokes, the pin 56 moves more than the tulip 26. In other words, the pin 56 achieves its maximum stroke quicker than the tulip 26.

Figure 4:
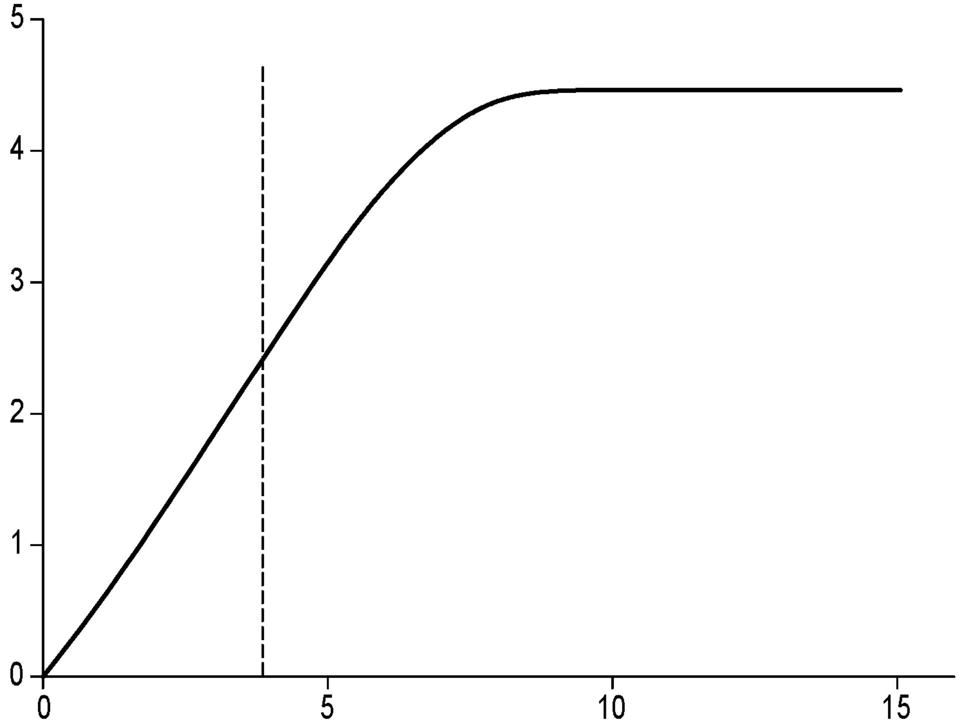
FIG. 4 shows a graph comparing the stroke of the secondary movable contact stroke (y-axis) against the stroke of the primary movable contact (x-axis).

To facilitate understanding of the invention, the disconnection of the circuit breaker 10 from the closed position to the open position, will be briefly discussed, with reference to FIGS. 1-3 showing the circuit breaker 10, and FIG. 4 which shows a graph of the stroke of the pin 56 (y-axis) against the stroke of the tulip 26 (x-axis).

The circuit breaker 10 is initially in the closed position as shown in FIG. 1 and has current flowing across it. During disconnection, a force is applied to the primary movable contact 25 to move it away from the secondary movable contact 55. The movement of the primary movable contact 25 in one direction is transformed to non-linear movement of the secondary movable contact 55 in the opposite direction. More specifically, the primary movable contact 25 will pull on the driving rod 88, which in turn will rotate the driving lever 81 about its pivot 82 (anticlockwise in the present view). The driving lever 81 then acts on the driven lever 91 through the pin and slot mechanism 83, rotating it about its pivot 92 (clockwise in the present view).

The follower pin 84 initially travels along the long section 96 of the slot (which in its current position is inverted to the curvilinear trajectory of the follower pin 84) and into the short section 95 of the slot 94. Due to the position and the shape of the slot 94 relative to the follower pin 84, the pin 56 is retracted right from the start of disconnection, and also retracted more than the tulip 26 proportionally to their maximum strokes.

The retraction of the pin 56 and tulip 26 continues at essentially the same rate as above with the rotation of the driving lever 81. The follower pin 84 keeps travelling in the slot 94 until it reaches the notional line between the pivots 82, 92 (and its closest point to the pivot 92 of the driven lever 91), where it then starts to moves in the opposite direction along the slot 94. The pin 56 is now at three-quarter of its maximum stroke. Retraction of the pin 56 and tulip 26 continues, until the follower pin 84 leaves the short straight section 95 of slot 94 and begins travelling in the long curved section 96. This can be said to be the intermediate position of the circuit breaker 10. For completeness, it will be mentioned that it takes about few millisecond for the pin 56 to reach this position.

FIG. 3 shows the position of the pin 56, and also the linkage mechanism 80, at the intermediate position of the circuit breaker 10. At this point onwards, the rotational movement of the driving lever 81 however has very little or no effect on the movement of the pin. This is because the driven lever 91 in its current position is located such that the long section 96 of the slot 94 corresponds with the curvilinear trajectory of the follower pin 84. The result is that the tulip 26 continues retracting, whereas the pin 56 retracts very little or not at all, with the pin tip 56A remaining within the fixed dielectric shield 66, i.e. generally between the front and rear of the (annular) fixed dielectric shield 66.

The relatively short stroke of the pin 56 compared to those of known circuit breakers helps ensures that it retracts quickly to within the fixed dielectric shield 66, so that the pin

56 and fixed dielectric shield 66 together reduce any dielectric risk and prevent dielectric flash-over. Once the pin 56 is essentially at its maximum stroke, only the tulip 26 continues moving towards it maximum stroke. This then completes the disconnection of the circuit breaker 10, the open position shown in FIG. 2. The circuit breaker 10 of the present invention can as such be viewed as having simplified double-motion, as the secondary movable contact 55 has a pin 56 but no counter-contact. For reconnection of the circuit breaker 10, the skilled person will appreciate that essentially the reverse of the above takes place.

The circuit breaker 10 of the invention represents a significant improvement over the prior art as it allows disconnection to occur rapidly while using less energy. By omitting a component, namely the counter-contact, the lighter pin 56 can be moved more easily and quickly, while consuming less energy. The reduced part-count of the secondary movable contact 55 also implies that the circuit breaker 10 is cheaper to produce, and also cheaper to operate as it consumes less energy.

Furthermore, the pin and slot connection 83 of the linkage mechanism 80 is configured to allow for the pin 56 to begin retraction from the start of disconnection, and to quickly retract the pin tip 56A to within the safety of the fixed dielectric shield 66, significantly reducing the dielectric risk and flash-over. The shortened stroke of the pin 56 is also advantageous as it means at the pin 56 needs to be moved less to be in the required position.

In contrast to the prior art, this allows disconnection to happen much quicker, and with less energy and movement involved. Whereas the skilled person would put more energy to achieve faster disconnection, the invention presents a novel and inventive approach to achieve this.

Although the secondary movable contact is described as comprising a tulip (for receiving the pin), this may possible not always be the case, and should therefore be understood in the broader sense of a pin-receiver. While the primary embodiment discusses the invention in the context of a double-motion HV circuit breakers using self-blast technology in a switchgear, the invention is not to be thus limited, and it will be apparent that it will be applicable to various types of switchgears, and whether or not they employ self-blast technology.

With the tulip being part of the primary movable member, and the pin being part of the secondary movable member, for reasons of brevity, the primary movable contact and secondary movable contact may have at times been simply referred to, respectively, as the tulip and pin.

The invention claimed is:

1. A non-linear double-motion circuit breaker comprising a primary movable contact and a secondary movable contact slidingly mounted within a primary holder and a secondary holder respectively, wherein the primary movable contact comprises a tulip and a contact cylinder attached thereto, and the secondary movable contact comprises a pin having a pin tip the circuit breaker further comprising a linkage mechanism arranged to allow non-linear movement of the secondary movable contact in an opposite direction to a movement of the primary movable contact wherein the secondary holder has a fixed dielectric shield an end opposing the primary holder, and in that the secondary movable contact does not comprise a counter-contact for engaging the contact cylinder.

2. The circuit breaker according to claim 1, wherein the linkage mechanism comprises a pivoted driving lever, a driving rod extending therefrom to the primary movable contact, a pivoted driven lever, and a driven rod extending therefrom to the secondary movable contact, the driving lever and driven lever being connected to each other through a pin and slot connection, a follower pin being provided on the driving lever and the slot being provided on the driven lever.

3. The circuit breaker according to claim 2, wherein the pin and slot connection is configured such that, during disconnection, rotation of the driving lever acts to rotate the driven lever such that the pin is retracted from a closed position to an intermediate position of the circuit breaker where the pin tip is within the fixed dielectric shield, and acts so as not to rotate the driven lever from the intermediate position to an open position of the circuit breaker such that the pin tip is maintained within the fixed dielectric shield, wherein the pin moves more than the primary movable contact, proportionally to their a plurality of maximum strokes, from the closed position to the intermediate position, and the primary movable contact moves more than the pin from the intermediate position to the open position of the circuit breaker.

4. The circuit breaker according to claim 3, wherein the slot has a short section which is straight and a long section which is curved.

5. The circuit breaker according to claim 4, wherein a curvature of the long section corresponds to a curvilinear trajectory of the follower pin.

6. The circuit breaker according to claim 3, wherein the pin and slot connection is configured such, that the pin moves from a start of disconnection.

7. The circuit breaker according to claim 3, wherein the pin and slot connection is configured such that, during disconnection, the pin stops moving halfway through a stroke of the primary movable contact.

8. The circuit breaker according to claim 3, wherein the pin and slot connection is configured such that, during disconnection, the follower pin moves first in one direction in the slot, and then in an opposite direction.

9. The circuit breaker according claim 1, wherein the pin has a stroke which is one-third that of the primary movable contact.

10. The circuit breaker according to claim 1, wherein the secondary holder has a bridge having a sleeve within which the pin is slidingly located, and spokes for supporting the sleeve.

11. The circuit breaker according to claim 1, wherein a cylindrical contact is arranged to engage the secondary holder.

12. A switchgear comprising the circuit breaker according to claim 1.

13. A method of disconnecting a non-linear double-motion circuit breaker, the method comprising: mounting a primary movable contact and a secondary movable contact slidingly within a primary holder and a secondary holder respectively, providing the primary movable contact with a tulip and an attached contact cylinder, and providing the secondary movable contact with a pin having a pin tip, providing a linkage mechanism allowing non-linear movement of the secondary movable contact in an opposite direction to a movement of the primary movable contact, wherein the method further comprises retracting the pin from the primary movable contact until the pin tip is within a fixed dielectric shield provided at an end of the secondary holder opposing the primary holder.

14. The method according to claim 13, further comprising providing the linkage mechanism with a pivoted driving lever, connecting a driving rod therefrom to the primary movable contact, providing a pivoted driven lever, and connecting a driven rod therefrom to the secondary movable contact, and connecting the driving lever and driven lever through a pin and slot connection by providing a follower pin on the driving lever and the slot on the driven lever.

15. The method according to claim 14, further comprising rotating the driving lever to rotate the driven lever such that the pin is retracted from a closed position, moving more than the primary movable contact, proportionally to a plurality of maximum strokes, until an intermediate position of the circuit breaker where the pin is within the fixed dielectric shield, and rotating the driving lever without rotating the driven lever such that the pin tip is maintained within the fixed dielectric shield, and the primary movable contact is retracted, moving more than the pin until the circuit breaker reaches an open position.

* * * * *